United States Patent [19]

Craun et al.

[11] Patent Number: 4,608,139

[45] Date of Patent: Aug. 26, 1986

[54] ELECTROCOATING PROCESS USING SHEAR STABLE CATIONIC LATEX

[75] Inventors: Gary P. Craun, Berea; Kirk J. Abbey, Seville, both of Ohio

[73] Assignee: SCM Corporation, New York, N.Y.

[21] Appl. No.: 747,251

[22] Filed: Jun. 21, 1985

[51] Int. Cl.$^4$ .............................................. C25D 13/06
[52] U.S. Cl. ................................................. 204/181.7
[58] Field of Search ..................................... 204/181.7

[56] References Cited

U.S. PATENT DOCUMENTS 4,017,372  4/1977  Wagener et al. ................. 204/181.7

Primary Examiner—Howard S. Williams
Attorney, Agent, or Firm—A. Joseph Gibbons; Thomas M. Schmitz

[57] ABSTRACT

Cationic electrocoat latices, containing blocked isocyanate crosslinker and which are usually unstable toward pumping and shear forces, can be stabilized by conducting the emulsion polymerization in a solvent-water mixture containing from about 20 to 30 percent solvent. Ethanol is a preferred solvent. Preferably the crosslinker is first emulsified and then added to the emulsion polymerization system prior to or during polymerization to produce mechanically stable latex that is virtually free of grit.

8 Claims, 4 Drawing Figures

AFTER SHEAR

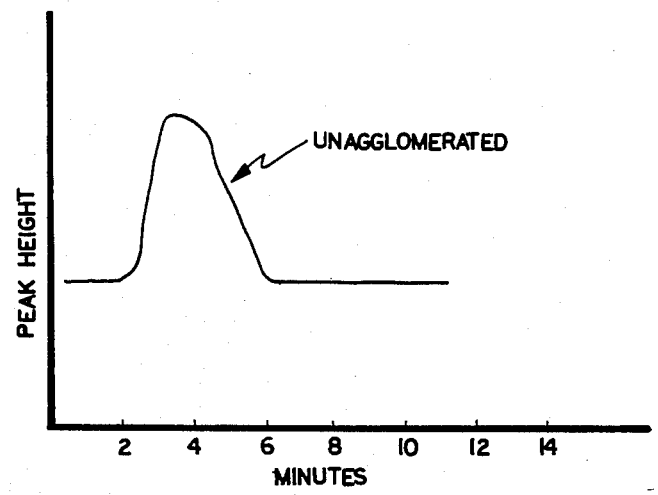
FIG. IA BEFORE SHEAR
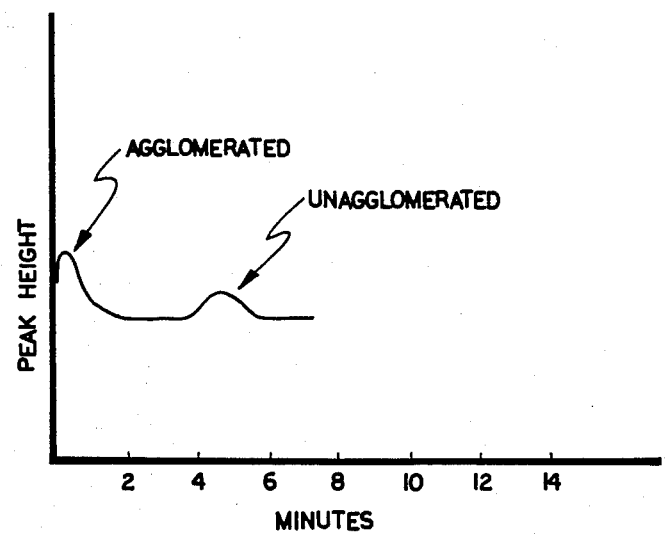
FIG. IB AFTER SHEAR

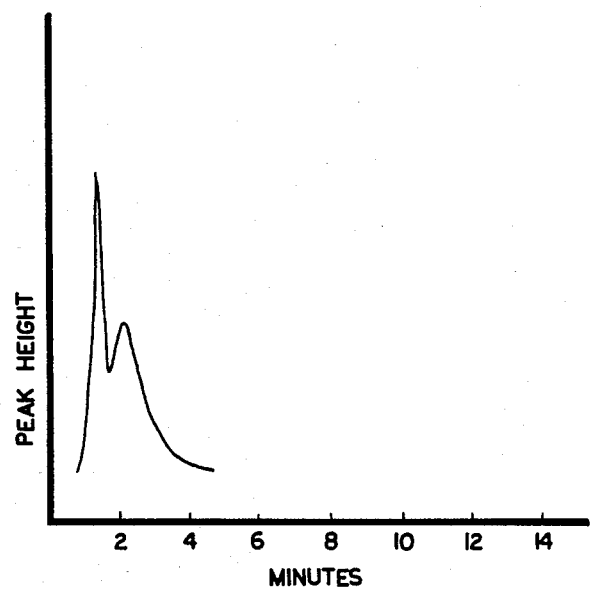
FIG. 2A BEFORE SHEAR
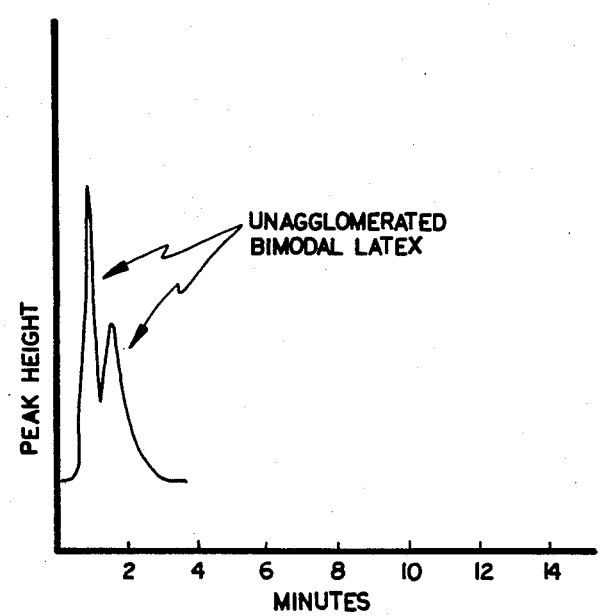
FIG. 2B AFTER SHEAR

ELECTROCOATING PROCESS USING SHEAR STABLE CATIONIC LATEX

The invention relates to improved cationic latices useful in coatings and to a process for imparting both cleanliness and shear stability to such latexes especially amino stabilized cationic latices.

BACKGROUND OF THE INVENTION

Although water-borne cationic resin systems are well know, the use of latex binders in cathodic electrocoating is quite new and has not yet achieved full commercial acceptance. Coassigned U.S. Ser. No. 513,621 filed July 14, 1983, now U.S. Pat. No. 4,512,860, which gives background information on electrocoating and especially latex for cathodic deposition, is incorporated herein by reference. Also incorporated by reference are coassigned U.S. Ser. No. 716,665 filed Mar. 27, 1985; and U.S. Ser. No. 716,664 filed Mar. 27, 1985, now U.S. Pat. No. 4,579,889, which relate to the stabilization of cationic latices and paints suitable for electrocoating. The term "latex" is defined as a polymer or copolymer prepared from one or more monomers in an aqueous environment by emulsion polymerization techniques. Such latex, usually having an average particle size from about 400 Å to about 10,000 Å and an average molecular weight ranging from about 10,000 up to and above 250,000, is quite different from the water-reducible or ionizable polymers prepared, not in aqueous medium, but in solvent systems or neat. The latter water-reducible, cation-active polymers have been in commercial use for electrodeposition coatings for some time. The latex polymers and cation-active latices of the present invention are preferred over the commercial water-borne or water-reducible coatings. Such cationic latices are known to be inherently less stable than their anionic counterpart systems. For electrodeposition coatings, it is necessary to develop a latex that can be pumped and will be relatively insensitive to shear forces.

Stability to shear is a necessary property for an electrocoating bath. In a commercial operation, the coating is continuously sheared by centrifugal pumping which passes the material through ultrafiltration membranes at a rate of 35–40 gallons/min. Instability of the coating, leading to agglomeration of particles after shear, would cause fouling of the ultrafiltration membrane, application problems, and loss of coating properties. The term "stable cationic latex" or "stable cationic latex paint composition" in the context of the present invention means a latex that when subjected to shear forces and/or pumping will be substantially non-agglomerated as determined by the HB/DCP shear test using a disc centrifuge described hereinafter.

U.S. Pat. No. 3,640,935 (Abriss) teaches a method of improving latex stability by adding to the latex a non-ionic surface-active agent (0.5–3%) as a solution in a water-soluble glycol. Heretofore a prepared latex was judged to be stable if it did not set to a gel after thirty minutes in the Hamilton Beach shear test. It now appears this test is not critical enough to determine particle agglomeration and gelling tendency. A HB/DCB shear test using a disc centrifuge (cf U.S. Pat. No. 4,311,039) was developed to critically examine latex products and to more critically access the degree of latex agglomeration. It was found that cationic latices often readily agglomerate when subjected to shear. Attempts to improve mechanical stability by increasing the cationic precursor amine monomer content or by the addition of conventional surfactants or additives, were insufficient to upgrade the latex to prevent severe agglomeration as determined by the new HB/DCB shear test method. Higher amine monomer level in the latex synthesis quite often diminishes latex conversion and increases dirt (coagulum) levels. In the instant invention improved latex stabilization and cleanliness have been achieved by an improved process for incorporating the crosslinker in an emulsion polymerization using a mixed aqueous/organic medium.

BRIEF SUMMARY OF THE INVENTION

One object of the invention is to provide a substantially grit-free and shear stable amine functional cationic latex prepared by emulsion polymerizing ethylenically unsaturated monomers and unsaturated amino group containing monomers in an aqueous medium wherein the emulsion polymerization is conducted (1) in an organic solvent/water system containing from about 10 to 40 weight percent water-miscible or water-soluble solvent selected from the group consisting of $C_{1-12}$ alkanols, ketones, esters, ethers, glycols, and alkoxyalkanols; and (2) in the presence of one or more latent crosslinking agents adapted to cure with functional groups in said polymer latex.

Another object relates to the latex prepared by emulsion polymerization in the presence of crosslinking agent which is incorporated into the polymerization system prior to or during the monomer polymerization either as an aqueous emulsion or as a solution in monomers.

A further object is an electrocoating paint and process for coating metal substrate incorporating said improved latex.

BRIEF DESCRIPTION OF THE DRAWINGS

The invention may be better understood by having reference to the annexed drawings herein.

FIG. 1 is a chart-depicting particle size distribution of shear unstable latex as analyzed by the disc centrifuge method before and after application of shear forces.

FIG. 2 is a chart depicting a shear stable latex before and after application of shear forces.

DETAILED DESCRIPTION OF THE INVENTION

This invention relates to structured cationic latices stabilized against mechanical shear which are prepared by emulsion polymerization of various ethylenically unsaturated monomers in a water/solvent mixture.

The term "structured cation-active latices" includes those where the cation-activity is derived from amino-containing monomers and/or from charge carrying species derived from bound initiator fragments such as amidino fragments resulting from the polymerization initiator. The former monomers can participate in the polymerization by virtue of ethylenic unsaturation; the latter impart cation activity by attachment to the polymer chains. "Stability" is defined as the absence of agglomerated latex particles as shown by disc centrifuge photosedimentometer traces after subjecting the latex to 30 minutes of mechanical shear using a Hamilton Beach high speed mixer. Such latices are preferably stabilized by the process of the instant invention which utilizes a solvent/water system for the emulsion polymerization and preferably the prior emulsification of the crosslinking agent. When the emulsion polymerization is conducted in 20% ethanol-water or isopropanol-water, the product latex shows no significant particle agglomeration as noted by disc centrifuge particle size analysis, even after 30 minutes of high shear stirring. The presence of the solvent also provides a convenient method of incorporating highly water-insoluble crosslinkers, such as blocked isocyanates, into latices and particularly introducing them prior to or during the polymerization.

Crosslinkers, such as for example chain-extended adducts of polyols with isophorone diisocyanate blocked with caprolactam, are water insoluble, large molecules which are difficult to incorporate into latices. If dissolved in monomer and added during polymerization, the crosslinker precipitates as a crystalline grit and consequently deposited films remain uncured after baking. With the addition of approximately 20% ethanol or isopropanol to the aqueous polymerization medium, grit is dramatically reduced and films cured properly. These solvents do not interfere with either the emulsion polymerization process, the electrodeposition or cure of the instant systems.

The cationic latices which comprise a major portion of the improved coating composition useful in electrodeposition coating of conductive substrate, particularly metal substrate, are prepared in an aqueous medium by emulsion polymerization of monomers having ethylenically unsaturated monomer. Preferred latices are described in coassigned U.S. Pat. No. 4,512,860 noted above. These can include all-acrylic or methacrylic monomers and mixtures of acrylics or methacrylics with other monomer types such as for example unsaturated hydrocarbon monomers, i.e. styrene, vinyl toluene and the like.

The term "latex" is understood to comprise a polymer or copolymer prepared from ethylenically unsaturated monomers in an aqueous environment by emulsion polymerization. The resin binder particles in a latex advantageously have a particle size from about 400 to 10,000 Å and were preferably in the 1500–6000 Å range. A cationic latex is a latex having a salt-forming precursor component, capable of being ionized with an acid type reaction whereby the ionized salt portion helps to effect water dispersibility of the latex binder. When the salt-forming precursor, preferably a primary, secondary or tertiary amine portion, is part of the polymeric chain, then such latices are said to be structurally cation active. When the cation portion is merely added as a non-polymeric unit, the latex is said to be cation active by the fact that the positively charged ions reside on the surface of the polymer particle. These non-structural types are not deemed to be structurally cation active.

The vinyl monomers most useful in forming the structured cation latex include acrylic and methacrylic esters, for example, methylmethacrylate, ethylmethacrylate, 2-ethylhexylmethacrylate, butylacrylate, isobornyl acrylate, isobutyl methacrylate and the corresponding hydroxy acrylates, e.g. hydroxyethyl acrylate, hydroxypropyl acrylate; also the glycol acrylates, allyl acrylates; and epoxy acrylates. Other suitable vinyl monomers include vinyl acetate, vinyl and vinylidene halides, e.g. vinyl chloride, vinylidene chloride amides such as methacrylamide and acrylamide; hydrocarbons such as butadiene, styrene, vinyl toluene and the like.

For structured cationic latex, additional vinyl monomers having base functionality are required. Amino groups are preferably incorporated in the vinyl monomers by using tertiary, secondary or primary amino functional acrylates, methacrylates, and acrylamides such as for example, dimethylaminoethyl methacrylate or acrylate, or dimethylaminopropyl acrylamide or methacrylamide. Such amine functional monomers are copolymerized in an aqueous system to build an amino functionality into the acrylate polymer which, when partially or fully neutralized with an ionizer, impart the cationic properties to the acrylic latex. Hydroxy functional monomers, such as hydroxypropyl methacrylate can be used at concentrations of 0.5 parts per hundred monomer (pphm) to over 20 pphm and preferably 5–15 pphm. Amine monomers, such as dimethylaminoethyl methacrylate preferably can be used at levels of about 0.01 and 5 pphm.

The structured cation-active latices prepared by emulsion polymerization in an aqueous medium and paints comprising the combination of said latex with various pigment grinds are preferably stabilized by the prepolymerization addition of specific organic solvents, preferably water-soluble organic alcohols, added in an amount sufficient to prevent latex particle agglomeration which would normally result when the latex is pumped or subjected to shear forces. By "water-soluble" solvent is meant an organic solvent, either water-miscible or having a solubility in water of at least 20 weight percent. Said solvents include for example, alcohols, glycols, ketones, esters particularly hydrophillic functional esters, ethers and cyclic ethers, hydroxylated ethers and the like, preferably those having up to 12 carbon atoms. The solvent can be used in amounts of about 1 to 50 percent and preferably 15–35 percent basis water plus organic solvent content in the emulsion polymerization. Suitable solvents are organic alcohols such as for example, methanol, ethanol, isopropanol; 2-(2-ethoxy ethoxy)ethanol; 2-(2-butoxy ethoxy)ethanol; 2-(2-methoxy ethoxy)-ethanol; 2-methoxy ethanol; 2-butoxy ethanol; 2-ethoxy ethanol; 2-butoxy propanol; 2-butoxy ethoxy propanol and the propoxy propanols; also useful are known glycols including ethylene and propylene glycols. Ethanol and isopropanol are most preferred due to their availability, cost and ease of removal prior to electrodeposition, if desired. In addition to the surprising mechanical stability afforded to the latex systems, it was observed that the presence of solvent was not detrimental to the electrocoating compositions and process and the characteristics of the resulting film. The amount of stabilizer solvent used during the polymerization process is critical in that it must be sufficient to prevent polymer agglomeration when the product latex is pumped or otherwise subjected to shear forces and yet comply with environmental (VOC) regulations. Of course, the composition of the latex will influence the choice of solvent and amount needed for stabilization.

As noted earlier, the selection of initiator is important in that it can contribute to the cation activity of the latex by attachment of charged initiator fragment species to the polymer. The initiators produce free radicals for the latex polymerization and can be, for example, certain redox systems such as: hydroxylamine hydrochloride in combination with t-butylhydroperoxide, azo types such as 2,2'-azobis(amidinopropane hydrochloride) ("AAP"), 2,2'-azobis isobutyronitrile ("AIBN"), 2,2'-azobis(2-isopropylimidazolium)dichloride, 2,2'-azobis(2-aminopropane)sulfate, or even an electron beam or gamma radiation.

Useful crosslinking agents which may be incorporated into emulsion polymer latex systems of the instant invention include known crosslinkers as for example, phenol formaldehyde, methylated melamine, urea formaldehyde, glycolurils, blocked isocyanates including polymerizable blocked isocyanates. Preferred agents are the blocked isocyanates including dimerized or trimerized isocyanates as represented in part by Hüls B1370, a triisocyanurate of isophorone diisocyanate blocked with acetone oxime (60% in xylene/butyl acetate) commercially available from Chemische Werke Hüls. Equally useful are chain-extended isophorone diisocyanates capped with E-caprolactam such as Goodyear VITEL C10045A or Carbill CR 2400. Preferred blocked isocyanates derived from polymerizable vinyl unsaturation include for example vinyl benzyl isocyanates, vinyl aryl isocyanates, vinyl phenyl, isopropenylphenyl and isopropenylbenzyl isocyanates and the like as exemplified in U.S. Pat. No. 3,654,336; 4,379,767; 4,399,074; 4,399,073; and 4,439,616. In this category the most preferred crosslinker is meta-isopropenyl-alpha,alpha-dimethylbenzyl isocyanate fully blocked with common blocking agents. Suitable blocking agents are those known in the art including alcohols, phenols, ketoximes and the like. Especially preferred blocking agents are caprolactam and 2-ethylhexyl alcohol or mixtures thereof. The general method of preparation is to add the isocyanate to the blocking agent with or without a catalyst, such as an organo-tin compound, over a period of time sufficient to control the exotherm, at a temperature high enough to achieve a reasonable blocking rate but low enough to prevent polymerization through the double bond or the reverse deblocking reaction. This temperature is normally 50°–120° C., depending on the particular isocyanate/blocking agent combination and the catalyst in use. Normally, a 0 to 10% excess of blocking agent is used; reaction is complete when free NCO content is essentially zero, as determined by either infra-red absorption spectroscopy or titration with standard n-butylamine solution.

Aqueous coatings of the above type may be applied either by conventional coating techniques or by electrodeposition. For cathodic electrodeposition it is necessary to neutralize or partially neutralize the amine portion of the polymer. Thus by neutralizing the amino resins desirable, aqueous compositions can be obtained for electrodeposition from solutions or dispersions of pH between 1 and 6 and preferably between about 2 and 5. This can be accomplished by acidification of all or part of the amino group functionality by an inorganic acid or an organic acid such as for example formic, acetic, or lactic acid and the like. In determining the degree of neutralization for a particular system, an amount of neutralizing acid is selected to solubilize or disperse the resin. Phosphoric acid is the preferred inorganic acid and lactic acid is a preferred organic acid for the acidification or partial acidification to form the amino cation active polymer compositions. In the preferred method the neutralizing acid is added before or during the polymerization.

Usually the cathodic resin composition will be present in water at concentrations from about 1 percent to about 30 percent by weight of resin for coating purposes although more concentrated aqueous compositions are generally desired for synthesis, storage, and shipping. Preferred useful bath concentrations are from 5 to 20 weight percent. The unpigmented compositions may be electrocoated to deposit clear coatings on the cathode electrode. More commonly these compositions will be used in combination with various pigment compositions and other additives known to the electrocoating art. Conventional pigment-containing compositions include organic and inorganic pigments and additives such as titanium dioxide, oxides, carbon black, talc, barium, sulfate as well as pigments or pseudo pigments known as plastic pigments such as polystyrene particles and the like.

Contrary to prior concepts that addition of organic solvent components to a latex paint often has caused gross destabilization and gellation, it is now found that the stability of the instant latex and paint toward shear is remarkably improved over the non-stabilized latex paint without detriment to corrosion, film integrity, and other desirable coating characteristics.

As noted above, coassigned U.S. Pat. No. 4,512,860 teaches an improvement using ion exchange techniques to treat the new latex systems prepared by emulsion polymerization of monomers in an aqueous environment and having cation active groups supplied by nitrogen-containing monomers or by initiators. By such treatment "amino" fragments, and low molecular weight monomers, are rendered non-conflicting with good elecrtrocoat systems. In the present invention using specific solvent stabilizers, and crosslinker incorporation, some latex systems can be used in electrocoating processes without prior ion exchange purification or other type of cleaning to remove ionic contamination. This represents an additional processing and cost advantage.

Hamilton Beach Test. The latex was strained through a 200-mesh sieve and an amount sufficient to contain 100 grams solids was weighted into a 24-ounce milkshake cup. Two grams defoamer was added and the sample was mixed for 30 minutes using the medium speed setting of Hamilton Beach Milkshake Mixer Model No. 30. The sample was removed and its consistency noted i.e., fluid, paste, dilatent, solid, etc. The weight of the residue (grit) retained on the sieve was expressed as percentage of the original latex solids.

Shear Stability Test. The disc centrifuge photosedimentometer (DCP) is known to be useful for determining particle size and particle size distribution for latex emulsions and other polymer systems (cf U.S. Pat. No. 3,475,968 and U.S. Pat. No. 4,311,039). The same concept, namely forcing particles (usually less than $2\mu$ in size) under high centrifugal force radically outwardly through a spin fluid or medium, is readily adaptable for the evaluation of particle agglomeration of the instant latex composition. Larger and denser particles traverse the medium faster than do those of smaller particle size. This technique is adaptable for both pigmented and non-pigmented latex systems. Optical analysis of the exiting particles provide a trace similar to those shown in FIG. 1. FIG. 1-A represents a shear-unstable latex which before shear is applied as a single broad peak at 2–6 minutes. FIG. 1-B shows the same latex after subjecting to Hamilton Beach mixing for 30 minutes. It is noted that as the latex agglomerates, the 4-minute unagglomerated peak decreases and an agglomerated latex peak appears at about 0.8 minute. All tests were run at disc centrifuge speeds of 3,586 rpm using dilute nonionic surfactant solution as spin medium.

In the electrocoating process the aqueous cathodic bath containing the neutralized cationic resin, pigments, additives, etc., is placed in contact with an electrically conductive anode, an electrically conductive cathode serving as the article to be coated. Current is applied (usually D.C.) at voltages between 50 and 500 volts whereby the organic resin migrates and is deposited on the conductive substrate to be coated such as for example steel, aluminum, iron and the like. Other bath components such as pigments, filler and additives are conveyed with the cathodically charged resin and deposited on the substrate. After deposition the coating substrate is removed from the bath and rinsed with deionized water prior to effecting a cure. The deposited coatings cure at elevated temperatures by the usual techniques of heating in ovens or with infra-red heaters. Curing temperatures usually range from about 300° F. to about 425° F.

The following illustrative Examples should not be narrowly construed. Unless otherwise indicated, parts and percentages are by weight and temperature is given in degrees Centigrade.

EXAMPLE 1

An emulsion polymer latex was prepared using the following ingredients and procedure:

| | | |
|---|---|---|
| A | 379 g | ethanol |
| | 1515 g | H$_2$O |
| | 3 g | Triton X 405* |
| | 1.8 g | H$_3$PO$_4$ (85%) |
| B | 21 g | butylacrylate |
| | 35 g | methylmethacrylate |
| C | 1.5 g | 2,2'azobis(2-amidinopropane)HCl |
| | 59 g | H$_2$O |
| D | 705 g | butylacrylate |
| | 519 g | methylmethacrylate |
| | 120 g | hydroxypropylmethacrylate |
| | 3 g | dimethylaminoethylmethacrylate |
| | 2.8 g | n-dodecylmercaptan |
| | 179 g | B1370 Crosslinker |
| E | 2.8 g | 2,2'-azobis(2-amidinopropane)HCL |
| | 120 g | H$_2$O |
| | 18 g | Triton X 405 |

*Triton X 405 surfactant from Rohm & Haas.

"A" was charged to a reactor and heated to 75° C. under a nitrogen blanket. Components "B" were added followed by "C" five minutes later. The crosslinker (Hüls B1370) was dissolved in the monomer mix "D". After about 20 minutes, "D" and "E" were pumped in parallel streams over a period of 4 and 4½ hours, respectively. The temperature was held for one hour and the reaction product cooled.

EXAMPLES 2-7

The procedure of Example 1 was repeated using no solvent (Control, Example 2) and with various solvents used in place of the ethanol (See Table I).

Cold-rolled steel panels (Bonderite 1000 treatment) were cathodically electrocoated at 5% solids for 1 minute at 200 volts. Cure was effected by heating in a forced air oven at 350° F. for 20 minutes. Panels typically exhibited 70% gloss (60°) and resisted 70 MEK rubs. Shear stability was evaluated using the Hamilton Beach and the Disc Centrifuge Agglomeration Tests. Results are shown in Table I. Stable latices exhibited little or no agglomeration as evidenced by the identify of the disc centrifuge traces compared with unsheared latex samples. Grit evaluation of the latex by filtration through a 200-mesh stainless steel sieve gave a value of weight (grams) retained on filter compared with original charge (grams). Results are shown in Table I.

TABLE I

| Example No. | Solvent | Grit* | Cure | Stability | MEK Rubs** |
|---|---|---|---|---|---|
| 1 | 20% ethanol | 2 | Yes | Yes | 90 |
| 2 | None | 87 | No | No | 10 |
| 3 | 20% isopropanol | 17 | Yes | Yes | 70 |
| 4 | 20% acetone | 28 | Yes | Partial | 60 |
| 5 | 20% propylene glycol | 26 | Yes | Partial | 60 |
| 6 | 30% ethanol | 17 | Yes | Not Evaluated | 95 |

*Grams grit per gallon latex sample; (all latices contained 107 g crosslinker (per gallon)).
**Number of double rubs to break through coating using moderate pressure and methylethyl ketone soaked rag.

EXAMPLE 8

A stable cationic electrocoat latex was prepared as follows: Blocked isocyanate crosslinker, 350 g (Hüls B1370) was dispersed in 3.5 g Triton X 405 and 350 g H$_2$O and emulsified in a Gaulin two-stage homogenizer at 300 kg/cm$^2$ in stage one and 50 kg/cm$^2$ in stage two.

| | | |
|---|---|---|
| A | 379 g | ethanol |
| | 1515 g | H$_2$O |
| | 6 g | Triton X 405 |
| | 2 g | H$_3$PO$_4$ (85%) |
| B | 21 g | butylacrylate |
| | 35 g | methylmethacrylate |
| C | 1.4 g | 2,2'-azobis(2-amidinopropane)HCl |
| | 59 g | H$_2$O |
| D | 702 g | butylacrylate |
| | 519 g | methylmethacrylate |
| | 120 g | hydroxypropylmethacrylate |
| | 2.8 g | dimethylaminoethylmethacrylate |
| | 2.8 g | n-dodecylmercaptan |
| E | 2.8 g | 2,2-azobis(2-amidinopropane)HCl |
| | 15 g | Triton X 405 |
| | 117 g | H$_2$O |

"A" components were heated to 75° C. under nitrogen and "B" components added thereto followed by "C" five minutes later.

Components "D", "E" and the emulsified crosslinker (Huls B1370) were pumped simultaneously over 4, 4½, and 3 hours, respectively. After holding temperature at 75° C. for one hour, the product latex was evaluated for grit and for shear stability. After shearing on a Hamilton Beach Scovill mixer (Model 30, medium speed setting), the latex showed negligible agglomeration as evidenced by the disc centrifuge trace (cf FIG. 2).

EXAMPLES 9-11

Example 8 was repeated using emulsified crosslinker (Hüls B1370) and 10% ethanol/water polymerization medium (Example 9) and with no solvent additive (Example 11). Example 10 used 20% ethanol as polymerization medium, but differs from Example 8 in that the crosslinker was added as a solution in the monomer mix. The various latices were evaluated for grit content, shear stability and ability to cure as shown in Table II.

Example 8 (emulsified crosslinker and 20% ethanol) represented the best overall performance and gave negligible grit, good cure and was shear stable whereas the same procedure using 10% ethanol (Example 9) was grit-free, cured properly, but was not stable toward shear forces. Similarly when no solvent is used, the resulting latices are not shear stable as shown in Examples 11 and 2. Obviously, the system (Example 8) using a solvent/water medium for emulsion polymerization and preemulsification of crosslinker is the preferred method.

FIG. 1 shows the results of shear forces on a shear unstable latex. The latex of Example 11 was evaluated using the disc centrifuge photosedimentometer (DSC) tracing both before (FIG. 1-A) and after (FIG. 1-B) subjecting to Hamilton Beach Shear Test (30 minutes at medium speed). The unagglomerated peak at 4.0 minutes decreases and a new peak (agglomerated particle) appears at about 0.8 minutes. In contrast, the stabilized bi-modal latex of Example 8 remains substantially unagglomerated (cf FIG. 2-A and FIG. 2-B) after Hamilton Beach mixing.

TABLE II

| Experiment No. | Solvent | Grit+ (gram/gallon) | Cure | Shear Stability | Crosslinker |
|---|---|---|---|---|---|
| 8 | 20% ETOH | 0.05 | Yes | Yes | emulsified* |
| 9 | 10% ETOH | 0.1 | Yes | No | emulsified* |
| 10 | 20% ETOH | 2.0 | Yes | Yes | in monomer** |
| 11 | none | 0.1 | Yes | No | emulsified* |
| 2 | none | 87 | No | No | in monomer** |

+Grams grit per gallon latex sample; (all latices contained 107 g crosslinker per gallon).
*Crosslinker incorporated as per Example 8
**Crosslinker dissolved in monomer mix.

What is claimed is:

1. In an electrocoating process which comprises:
    (a) providing an amine functional cationic latex by emulsion polymerizing ethylenically unsaturated monomers and amino group containing monomers in an aqueous medium in the presence of a surfactant, a polymerization initiator and an organic or inorganic acid sufficient to at least partially neutralize said amine functional latex;
    (b) formulating an electrocoating paint by combining said neutralized cationic latex with a pigment grind and diluting with deionized water to non-volatile content of 3–30;
    (c) electrocoating an electrically conductive substrate serving as a cathode by passing an electric current between said cathode and an anode in contact with said electrocoating paint; and
    (d) curing said coated substrate;
the improvement which comprises stabilizing against shear forces either the latex or the paint formulated thereform by conducting the said emulsion polymerization in a solvent/water system containing from about 10 weight percent to about 50 weight percent water-miscible or water-soluble organic solvent selected from the group consisting of $C_{1-12}$ lower alkanols, ketones, esters, ethers, glycols, and alkoxyalkanols and by conducting the polymerization in the presence of one or more latent crosslinking agents adapted to enhance cure by reaction with functional groups on said polymer latex.

2. The process of claim 1 wherein the amine functional cationic latex or paint exhibits a substantial lack of particle agglomeration after pumping or subjecting to mechanical shear forces as determined by disc centrifuge photosedimentometer.

3. The process of claim 2 wherein the crosslinking agent is preemulsified and added to the solvent/water emulsion polymerization system either prior to or during the polymerization.

4. The process of claim 3 wherein the organic solvent is a lower alkanol and the crosslinking agent is a blocked multifunctional isocyanate.

5. The process of claim 4 wherein the latex is a copolymer of butyl acrylate, methyl methacrylate, hydroxypropyl methacrylate and dimethylaminoethyl methacrylate; the solvent is ethanol; the surfactant is a nonionic surfactant; the crosslinker is prehomogenized; and the polymerization initiator is 2,2-azobis(amidinopropane hydrochloride).

6. The process of claim 5 wherein the emulsion polymerization is conducted in a solvent/water system containing 15 to 35 weight percent organic solvent.

7. The process of claim 4 wherein the preemulsified crosslinker is added simultaneously with the bulk of the polymerizable ethylenically unsaturated monomers and amino group containing monomers.

8. A substrate coated according to the process of claim 1.

* * * * *